(12) United States Patent
Jahanzeb et al.

(10) Patent No.: US 12,249,839 B2
(45) Date of Patent: Mar. 11, 2025

(54) WIRELESS POWER TRANSFER STRUCTURE

(71) Applicant: Apple Inc., Cupertino, CA (US)

(72) Inventors: Agha Jahanzeb, San Ramon, CA (US); Arash Akhavan Fomani, Saratoga, CA (US); Matthew J Chabalko, Salinas, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/166,858

(22) Filed: Feb. 9, 2023

(65) Prior Publication Data
US 2024/0097490 A1   Mar. 21, 2024

Related U.S. Application Data

(60) Provisional application No. 63/370,855, filed on Aug. 9, 2022.

(51) Int. Cl.
*H02J 50/00* (2016.01)
*H01F 27/24* (2006.01)
(Continued)

(52) U.S. Cl.
CPC ............ *H02J 50/005* (2020.01); *H01F 27/24* (2013.01); *H01F 27/306* (2013.01); *H02J 50/10* (2016.02)

(58) Field of Classification Search
CPC ......... H02J 50/005; H02J 50/10; H01F 27/24; H01F 27/306
See application file for complete search history.

(56) References Cited

U.S. PATENT DOCUMENTS

| | | | |
|---|---|---|---|
| 11,552,505 B1 * | 1/2023 | Patron | H02J 50/005 |
| 2014/0345119 A1 * | 11/2014 | Tremel | H01F 27/2871 |
| | | | 29/745 |

(Continued)

FOREIGN PATENT DOCUMENTS

| | | |
|---|---|---|
| EP | 2814046 A2 | 12/2014 |
| WO | 2009027674 A1 | 3/2009 |

(Continued)

OTHER PUBLICATIONS

International Search Report and Written Opinion for PCT Patent Application No. PCT/US2023/029734 dated Nov. 27, 2023; 16 pgs.

*Primary Examiner* — Jared Fureman
*Assistant Examiner* — Duc M Pham
(74) *Attorney, Agent, or Firm* — FLETCHER YODER PC

(57) ABSTRACT

An electronic device can include a metallic housing defining an interior that contains one or more systems of the electronic device. The metallic housing can further define a pocket within the metallic housing separated from the interior. The pocket can have a window to an exterior of the metallic housing to facilitate wireless power transfer. An electronic device can include a non-metallic housing defining an interior that contains one or more systems of the electronic device and a wireless power transfer module that further includes a metallic structure defining a receptacle separated from the interior housing. The receptacle can have at least one open side to facilitate wireless power transfer. In either case, the wireless power transfer coil can be disposed at least partially or completely within the pocket or receptacle.

24 Claims, 3 Drawing Sheets

(51) Int. Cl.
   *H01F 27/30*   (2006.01)
   *H02J 50/10*   (2016.01)

(56) References Cited

U.S. PATENT DOCUMENTS

| | | | |
|---|---|---|---|
| 2017/0250578 A1* | 8/2017 | Kallman | H01F 27/02 |
| 2019/0108940 A1 | 4/2019 | Ngahu et al. | |
| 2023/0143925 A1* | 5/2023 | Carroll | G01N 33/2858 |
| | | | 324/239 |
| 2023/0275460 A1* | 8/2023 | Xu | H02J 50/70 |
| | | | 307/104 |

FOREIGN PATENT DOCUMENTS

| | | |
|---|---|---|
| WO | 2013185289 A1 | 12/2013 |
| WO | 2015038544 A2 | 3/2015 |

* cited by examiner

WIRELESS POWER TRANSFER STRUCTURE

CROSS-REFERENCE TO RELATED APPLICATIONS

This application claims the benefit of U.S. Provisional Application No. 63/370,855, filed Aug. 9, 2022, entitled "WIRELESS POWER TRANSFER STRUCTURE," which is hereby incorporated by reference in its entirety for all purposes.

BACKGROUND

Wireless power transfer has become increasingly popular in a wide variety of electronic devices. For example, many electronic devices, such as smart phones, tablet computers, smart watches, wireless earphones, styluses, etc. may employ wireless power transfer to facilitate charging of batteries within the devices. Various applications may have different requirements for the physical configuration of the wireless power transfer structures.

SUMMARY

Disclosed herein are various wireless power transfer structures that may have applicability to various wireless power transfer applications. As but one non-limiting example, the structures herein may be useful when employed with relatively high frequency wireless power transfer systems and/or systems in which wireless power transfer takes place between an electronic device (for example a tablet computer) and an associated accessory (for example a stylus).

An electronic device can include a metallic housing defining an interior that contains one or more systems of the electronic device. The metallic housing can further define a pocket within the metallic housing separated from the interior. The pocket can have a window to an exterior of the metallic housing to facilitate wireless power transfer. The electronic device can further include a wireless power transfer coil having a magnetic core and a winding disposed at least partially within the pocket. The wireless power transfer coil can be disposed completely within the pocket. The magnetic core can be a nickel-zinc ferrite. The magnetic core can have a C-shaped cross section. The ends of the C-shaped cross section can be disposed within or adjacent the window. The winding can be wrapped about a central portion of the C-shaped cross-section. The winding can be a single layer winding. The winding can include a plurality of wire strands per turn. The winding can further include one or more non-metallic spacers disposed between strands of the winding. The electronic device can further include a conductive shim disposed between the wireless power transfer coil and a metallic wall defining the pocket. The conductive shim can be formed of copper tape affixed to the metallic wall defining the pocket.

An electronic device can include a non-metallic housing defining an interior that contains one or more systems of the electronic device and a wireless power transfer module that further includes a metallic structure defining a receptacle separated from the interior housing. The receptacle can have at least one open side to facilitate wireless power transfer. The module can further include a wireless power transfer coil that includes a magnetic core and a winding disposed at least partially within the metallic receptacle. The metallic structure defining the receptacle can be affixed to the non-metallic housing. The wireless power transfer coil can be disposed completely within the receptacle. The magnetic core can be a nickel-zinc ferrite. The magnetic core can have a C-shaped cross section. The ends of the C-shaped cross section can be disposed within or adjacent the window. The winding can be wrapped about a central portion of the C-shaped cross-section. The winding can be a single layer winding. The winding can include a plurality of wire strands per turn. The winding can further include one or more non-metallic spacers disposed between strands of the winding. The electronic device can further include a conductive shim disposed between the wireless power transfer coil and a metallic structure defining the receptacle. The conductive shim can be formed of copper tape affixed to the metallic structure defining the receptacle.

A wireless power transfer module can include a metallic structure defining a receptacle having at least one open side to facilitate wireless power transfer and a wireless power transfer coil comprising a magnetic core and a winding disposed at least partially within the metallic receptacle. The magnetic core can have a C-shaped cross section, the ends of the C-shaped cross section can be disposed within or adjacent the open side, and the winding can be a single-layer winding wrapped about a central portion of the C-shaped cross section. The winding can further include a plurality of wire strands per turn. The winding can further include one or more non-metallic spacers disposed between strands of the winding.

DETAILED DESCRIPTION

Figure 1:
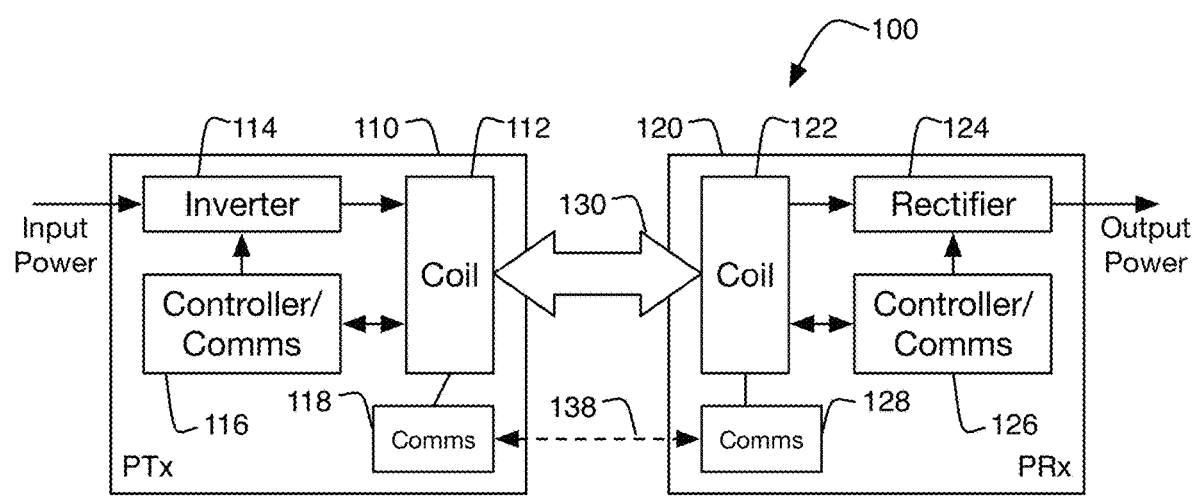
FIG. 1 illustrates a simplified block diagram of a wireless power transfer system.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth to provide a thorough understanding of the implementations described herein. In other instances, methods, procedures, and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

FIG. 1 illustrates a simplified block diagram of a wireless power transfer system 100. Wireless power transfer system includes a power transmitter (PTx) 110 that transfers power to a power receiver (PRx) 120 wirelessly, such as via inductive coupling 130. Power transmitter 110 may receive input power that is converted to an AC voltage having particular voltage and frequency characteristics by an inverter 114. Inverter 114 may be controlled by a controller/communications module 116 that operates as further described below. In various embodiments, the inverter controller and communications module may be implemented in a common system, such as a system based on a microprocessor, microcontroller, or the like. In other embodiments, the inverter controller may be implemented by a separate controller module and communications module that have a means of communication between them. Inverter 114 may be constructed using any suitable circuit topology (e.g., full bridge, half bridge, etc.) and may be implemented using any suitable semiconductor switching device technology (e.g., MOSFETs, IGBTs, etc. made using silicon, silicon carbide, or gallium nitride devices).

Inverter 114 may deliver the generated AC voltage to a transmitter coil 112. In addition to a wireless coil allowing magnetic coupling to the receiver, the transmitter coil block 112 illustrated in FIG. 1 may include tuning circuitry, such as additional inductors and capacitors, that facilitate operation of the transmitter in different conditions, such as different degrees of magnetic coupling to the receiver, different operating frequencies, etc. The wireless coil itself may be constructed in a variety of different ways. In some embodiments, the wireless coil may be formed as a winding of wire around a suitable bobbin. In other embodiments, the wireless coil may be formed as traces on a printed circuit board. Other arrangements are also possible and may be used in conjunction with the various embodiments described herein. The wireless transmitter coil may also include a core of magnetically permeable material (e.g., ferrite) configured to affect the flux pattern of the coil in a way suitable to the particular application. The teachings herein may be applied in conjunction with any of a wide variety of transmitter coil arrangements appropriate to a given application.

PTx controller/communications module 116 may monitor the transmitter coil and use information derived therefrom to control the inverter 114 as appropriate for a given situation. For example, controller/communications module may be configured to cause inverter 114 to operate at a given frequency or output voltage depending on the particular application. In some embodiments, the controller/communications module may be configured to receive information from the PRx device and control inverter 114 accordingly. This information may be received via the power transmission coils (i.e., in-band communication) or may be received via a separate communications channel (not shown, i.e., out-of-band communication). For in-band communication, controller/communications module 116 may detect and decode signals imposed on the magnetic link (such as voltage, frequency, or load variations) by the PRx to receive information and may instruct the inverter to modulate the delivered power by manipulating various parameters of the generated voltage (such as voltage, frequency, etc.) to send information to the PRx. In some embodiments, controller/communications module may be configured to employ frequency shift keying (FSK) communications, in which the frequency of the inverter signal is modulated, to communicate data to the PRx. Controller/communications module 116 may be configured to detect amplitude shift keying (ASK) communications or load modulation-based communications from the PRx. In either case, the controller/communications module 126 may be configured to vary the current drawn on the receiver side to manipulate the waveform seen on the Tx coil to deliver information to from the PRx to the PTx. For out-of-band communication, additional modules that allow for communication between the PTx and PRx may be provided, for example, WiFi, Bluetooth, or other radio links or any other suitable communications channel.

As mentioned above, controller/communications module 116 may be a single module, for example, provided on a single integrated circuit, or may be constructed from multiple modules/devices provided on different integrated circuits or a combination of integrated and discrete circuits having both analog and digital components. The teachings herein are not limited to any particular arrangement of the controller/communications circuitry.

PTx device 110 may optionally include other systems and components, such as a separate communications module 118. In some embodiments, comms module 118 may communicate with a corresponding module tag in the PRx via the power transfer coils. In other embodiments, comms module 118 may communicate with a corresponding module using a separate physical channel 138.

As noted above, wireless power transfer system also includes a wireless power receiver (PRx) 120. Wireless power receiver can include a receiver coil 122 that may be magnetically coupled 130 to the transmitter coil 112. As with transmitter coil 112 discussed above, receiver coil block 122 illustrated in FIG. 1 may include tuning circuitry, such as additional inductors and capacitors, that facilitate operation of the transmitter in different conditions, such as different degrees of magnetic coupling to the receiver, different operating frequencies, etc. The wireless coil itself may be constructed in a variety of different ways. In some embodiments, the wireless coil may be formed as a winding of wire around a suitable bobbin. In other embodiments, the wireless coil may be formed as traces on a printed circuit board. Other arrangements are also possible and may be used in conjunction with the various embodiments described herein. The wireless receiver coil may also include a core of magnetically permeable material (e.g., ferrite) configured to affect the flux pattern of the coil in a way suitable to the particular application. The teachings herein may be applied in conjunction with any of a wide variety of receiver coil arrangements appropriate to a given application.

Receiver coil 122 outputs an AC voltage induced therein by magnetic induction via transmitter coil 112. This output AC voltage may be provided to a rectifier 124 that provides a DC output power to one or more loads associated with the PRx device. Rectifier 124 may be controlled by a controller/communications module 126 that operates as further described below. In various embodiments, the rectifier controller and communications module may be implemented in a common system, such as a system based on a microprocessor, microcontroller, or the like. In other embodiments, the rectifier controller may be implemented by a separate controller module and communications module that have a means of communication between them. Rectifier 124 may be constructed using any suitable circuit topology (e.g., full bridge, half bridge, etc.) and may be implemented using any suitable semiconductor switching device technology (e.g., MOSFETs, IGBTs, etc. made using silicon, silicon carbide, or gallium nitride devices).

PRx controller/communications module 126 may monitor the receiver coil and use information derived therefrom to control the rectifier 124 as appropriate for a given situation. For example, controller/communications module may be configured to cause rectifier 124 to operate provide a given output voltage depending on the particular application. In some embodiments, the controller/communications module may be configured to send information to the PTx device to effectively control the power delivered to the receiver. This information may be received sent via the power transmission coils (i.e., in-band communication) or may be sent via a separate communications channel (not shown, i.e., out-of-band communication). For in-band communication, controller/communications module 126 may, for example, modulate load current or other electrical parameters of the received power to send information to the PTx. In some embodiments, controller/communications module 126 may be configured to detect and decode signals imposed on the magnetic link (such as voltage, frequency, or load variations) by the PTx to receive information from the PTx. In some embodiments, controller/communications module 126 may be configured to receive frequency shift keying (FSK) communications, in which the frequency of the inverter signal has been modulated to communicate data to the PRx. Controller/communications module 126 may be configured to generate amplitude shift keying (ASK) communications or load modulation-based communications from the PRx. In either case, the controller/communications module 126 may be configured to vary the current drawn on the receiver side to manipulate the waveform seen on the Tx coil to deliver information to from the PRx to the PTx. For out-of-band communication, additional modules that allow for communication between the PTx and PRx may be provided, for example, WiFi, Bluetooth, or other radio links or any other suitable communications channel.

As mentioned above, controller/communications module 126 may be a single module, for example, provided on a single integrated circuit, or may be constructed from multiple modules/devices provided on different integrated circuits or a combination of integrated and discrete circuits having both analog and digital components. The teachings herein are not limited to any particular arrangement of the controller/communications circuitry. PRx device 120 may optionally include other systems and components, such as a communications ("comms") module 128. In some embodiments, comms module 128 may communicate with a corresponding module in the PTx via the power transfer coils. In other embodiments, comms module 128 may communicate with a corresponding module or tag using a separate physical channel 138.

Numerous variations and enhancements of the above-described wireless power transmission system 100 are possible, and the following teachings are applicable to any of such variations and enhancements.

Figure 2:
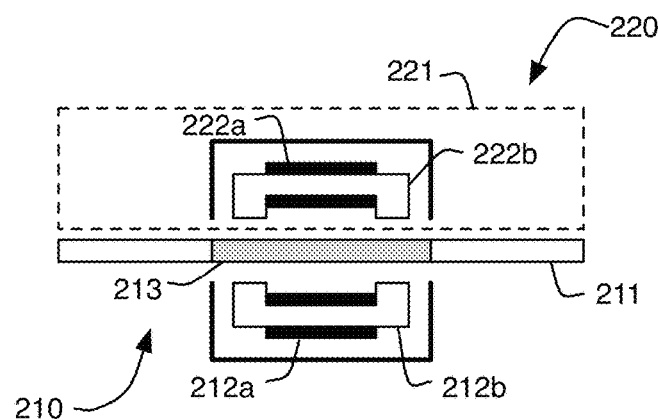
FIG. 2 depicts a portion of a first electronic device, which may be a wireless power transmitter, and a portion of an additional/second electronic device/accessory that can receive power wirelessly from the first electronic device.

FIG. 2 depicts a portion of an electronic device 210, which may be a wireless power transmitter. Electronic device 210 may include a housing 211, a window therethrough for wireless power transfer (e.g., inductive power transfer), and a non-metallic cover 213. The housing may be metallic or non-metallic. More specifically, FIG. 2 depicts a cross sectional view showing housing 211, which has a window or opening therethrough that is located "above" the wireless power transfer coil, which can include winding 212a wrapped around a core 212b. Although illustrated and described herein as "above," it is to be understood that the window through the housing and wireless power transfer coil could be disposed in any orientation in any surface of the electronic device, such that it could be above, below, beside, etc. Also, the illustrated orientation and configuration of the wireless power transfer coil, with a "c-shaped" core 212b and a winding wound around a central longitudinal portion of such core is but one example configuration. Other coil configurations could be provided. In the illustrated example, core 212b can be formed from a ferrite material, e.g., a ceramic or other non-metallic/non-conductive material with ferromagnetic particles disposed therein. Likewise, the wireless power transfer coil could be positioned in any desired orientation with respect to electronic device 210 and the window through housing 211. The illustrated horizontal configuration is but one exemplary configuration.

Electronic device 210 can include a non-metallic cover 213 that can be disposed within the window through housing 211. Non-metallic cover 213 can be formed from any suitable material. Suitability can include: (1) being non-conductive so as to allow for magnetic coupling between the wireless power transfer winding and a corresponding external wireless power transfer winding, (2) having mechanical properties that provide a suitable degree of mechanical protection (including moisture ingress protection) for the wireless power transfer winding and other internal components of electronic device 210, (3) a surface finish that provides an aesthetically-pleasing look to electronic device by matching or otherwise coordinating with housing 211, and (4) any other desired properties. Exemplary materials that may be used include polymer materials such as plastic, rubber, etc.

Non-metallic cover 213 can be secured in the window through housing 211 in a variety of ways, including an interference fit (in which friction between the mating surfaces of housing 211 and non-metallic cover 213 retain the non-metallic cover in position), adhesives (in which housing 211 is bonded to non-metallic cover 213), or mechanical retaining features (such as flanges or other fixtures that serve to retain non-metallic cover 213). In some embodiments, other securing techniques or combinations of the listed securing techniques could be used as appropriate. Also, as illustrated in FIG. 2, there may be, but need not be, a slight gap between the wireless power transfer coil and the non-metallic cover 213. Alternatively, this gap could be eliminated and used as part of the mechanism for securing non-metallic cover 213, potentially in common with one or more of the above-described securing techniques. For example, a flange on the internal side of non-metallic cover 213 could prevent it from falling out of the window, while the wireless power transfer winding could be secured inside the housing of the electronic device by any appropriate technique, and the immobility of the wireless power transfer winding could prevent non-metallic cover 213 from falling out of the window into the inside of the housing.

FIG. 2 also depicts a portion of an additional electronic device/accessory 220 that can receive power wirelessly from electronic device 210. Electronic device/accessory 220 may also be considered an additional electronic device and may be referred to herein as just "an electronic device." Electronic device 220 may include a housing 221, which may be non-metallic to facilitate wireless power transfer (e.g., inductive power transfer). Alternatively, electronic device 220 could include a metallic housing with a window for wireless power transfer as described above. More specifically, FIG. 2 depicts a cross sectional view showing housing 221 containing a wireless power transfer coil, which can include winding 222a wrapped around a core 222b. Although illustrated and described herein as being "above," electronic device 210, it is to be understood that electronic device 220 could be disposed in any orientation relative to electronic device 210, such that it could be above, below, beside, etc. Also, the illustrated orientation and configuration of the wireless power transfer coil, with a "c-shaped" core 222b and a winding wound around a central longitudinal portion of such core is but one example configuration. Other coil configurations could be provided. In the illustrated example, core 222b can be formed from a ferrite material, e.g., a ceramic or other non-metallic/non-conductive material with ferromagnetic particles disposed therein. Likewise, the wireless power transfer coil could be positioned in any desired orientation with respect to electronic device 220. The illustrated horizontal configuration is but one exemplary configuration. A mechanism (not shown) for securing electronic device/accessory 220 to electronic device 210 could also be provided. Such securing mechanisms could include magnets positioned within the respective housings 211/221, detents formed in the respective housings, tabs and slots in the respective housings, etc. Such securing mechanisms may be configured to locate electronic devices 210/220 so as to provide alignment between wireless power transfer coils 112 and 122 that provides sufficient coupling to achieve the desired degree of wireless power transfer.

Figure 3:
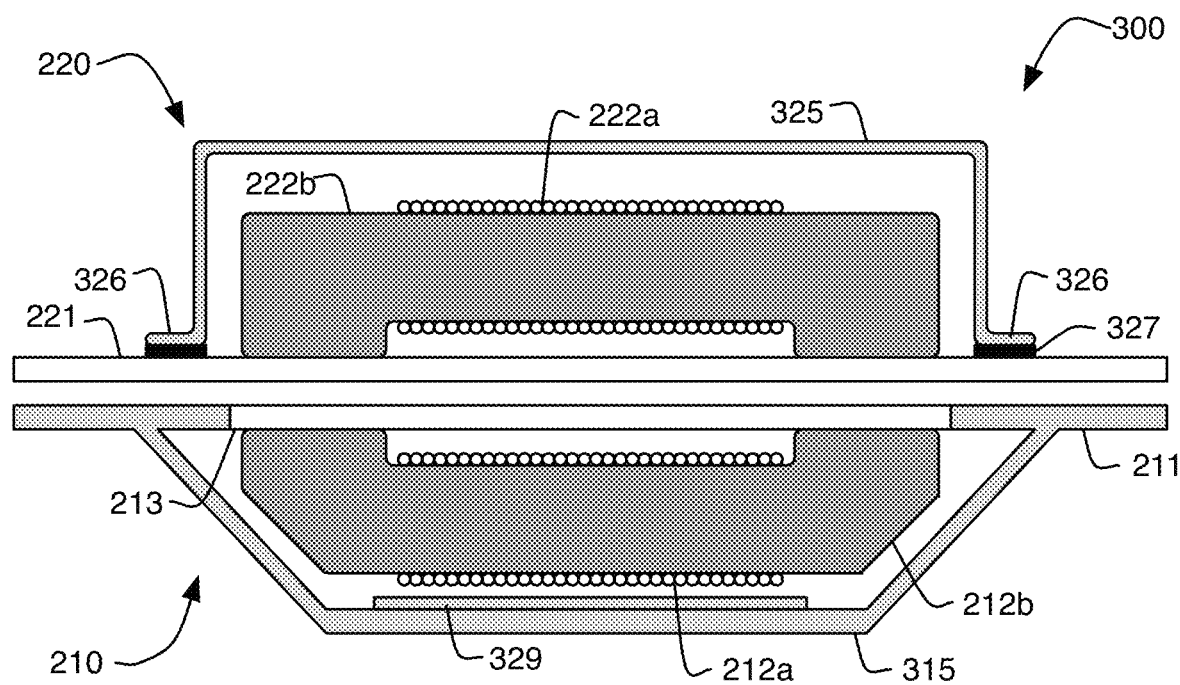
FIG. 3 illustrates an enlarged view of the wireless power transfer coil configuration of the first electronic device and the second electronic device.

FIG. 3 illustrates an enlarged view 300 focusing on the wireless power transfer coil configuration of a first electronic device 210 (e.g., a wireless power transmitter or PTx) and a second electronic device 220 (e.g., a wireless power receiver or PRx). For purposes of the following description, it is assumed that electronic device 210 is a wireless power transmitter and electronic device 220 is a wireless power receiver, but the reverse could be true. Also, either or both devices may be capable of both sending and receiving wireless power. Thus, features that are described below should not be construed as being limited to only a PTx or PRx device unless an alternative interpretation would be physically impossible or non-sensical.

Beginning with electronic device 210, the device may include a housing 211. The housing may be metallic, formed from any suitable material. As one non-limiting example, the material could be aluminum or an aluminum alloy. Because housing 211 is metallic, a window may be provided in the metallic housing to allow magnetic or electromagnetic coupling that facilitates wireless power transfer. As described above, the window may be filled with a suitable non-metallic material that permits or facilitates wireless power transfer. Metallic housing 211 may define a pocket 315 in which the wireless power transfer coil may be positioned. This pocket may be formed integrally with the metallic housing by any suitable process including casting, machining, etc. In some cases, pocket 315 can be formed separately from the remainder of metallic housing 211 and affixed to metallic housing 211 by welding, soldering, or other suitable means of attachment. In any case, pocket 315 may serve as a shield to isolate various components or systems (not shown) of electronic device 210 from the magnetic and electromagnetic fields associated with the wireless power transfer system. This is the case even if the walls of pocket 315 includes holes, notches, or other openings (not shown) that allow the wires for the wireless power transfer coil to enter/exit the pocket.

As described above, electronic device 210 may further include a wireless power transfer coil, formed of a winding 212a and a core 212b. Winding 212a may take a variety of forms and may be made from one or more turns of wire wrapped around core 212b. Electrical current flowing through winding 212a can induce a magnetic flux in core 212b, with this magnetic flux being the mechanism by which power is transferred from PTx to PRx. Along with the physical dimensions of the coil, the number of turns of winding 212a can determine the inductance of the wireless power transfer coil, which may be selected to achieve the desired level of power transfer at the desired frequency. For operation at high frequencies, e.g., above 10 MHz and, for example, 13.56 MHz, a relatively low inductance may be required. This inductance may vary with the amount of power transfer required, but in some applications may be on the order of nanohenries (nH). In at least some embodiments, winding 212a may be formed from a single layer winding, meaning that there is a single layer of turns, although this need not be the case depending on the requirements of a particular application.

Core 212b may be made of any suitable ferromagnetic material, such as ferrite. Ferrites may include any of a variety of non-metallic materials (e.g., ceramics) having ferromagnetic particles dispersed therein. In some embodiments, the ferrite material may include a nickel-zinc (NiZn) material as the ferromagnetic component. Such materials may be advantageous when using higher wireless power transfer frequencies, e.g., frequencies above 10 MHz, including for example 13.56 MHz. The ferrite making up core 212b may be formed into what is effectively a "C" shape, illustrated in cross section in FIG. 3. The protrusions of the ends of the "C" shape may reduce the distance between a corresponding core of a wireless power transfer coil in device 220, for example. This reduced distance can improve the coupling coefficient "k" between the coils, allowing for higher power transfer levels. Core 212b may have other shaping features, such as the illustrated chamfers, that can allow the core to maximize the fraction of the volume of pocket 315 occupied by the core, which can improve wireless power transfer performance.

In at least some applications, an additional conductive sheath or shield 329 may be provided between the wireless power transfer coil and the wall of pocket 315. This additional conductive sheath or shield may be made from a material that is more conductive than the material defining pocket 315 and/or housing 211. For example, while housing 211 may be made from aluminum or an aluminum alloy, conductive sheath or shield 329 may be made from copper. The benefit of this additional, more conductive material is providing better isolation of the magnetic and electromagnetic fields associated with the wireless power transfer coil from additional components of electronic device 210. The benefits may be greater when conductive sheath or shield 329 is made from a material having a greater difference in conductivity as compared to the material defining housing 211 and/or pocket 315. For example, if housing 211 were made from a material with a lower conductivity (e.g., stainless steel) a copper sheath or shield 329 might provide even greater performance benefits than in the case of an aluminum housing/cavity. The conductive shield or sheath may take a variety of forms, such as a copper tape affixed to the inside wall of cavity 315, copper plating of the inside wall of cavity 315, a copper shim positioned between the wireless power transfer coil and the interior wall of cavity 315, etc. It may be preferable for the thickness of conducive sheath or shield 329 to be at least the skin depth of the material at the frequency used for wireless power transfer, such that the wireless power transfer fields interact substantially only with the conductive sheath 329 and not with the wall of cavity 315.

Turning to electronic device 220, the device may include a housing 221. The housing may be non-metallic, formed from any suitable material. As one non-limiting example, the material could be a suitable plastic. Because housing 221 is non-metallic, a window (like window of FIG. 2 discussed above) is not needed to allow for wireless power transfer.

Disposed within housing 221 may be a metallic receptacle 325 in the form of a "can" or "box" that is open on at least one side to facilitate wireless power transfer. Metallic receptacle 325 can define a pocket into which the wireless power transfer coil may be positioned. In some cases, receptacle 325 can be formed and affixed to non-metallic housing 221 by adhesives or other suitable means of attachment 327. This may include flanges 326 or other suitable features to achieve the desired fixation. In some cases, receptacle 325 need not be affixed directly to housing 221, and instead may be secured in position by virtue of other structures, systems, or devices (not shown). In any case, receptacle 325 may serve as a shield to isolate various components or systems (not shown) of electronic device 220 from the magnetic and electromagnetic fields associated with the wireless power transfer system.

As described above, electronic device 220 may further include a wireless power transfer coil, formed of a winding 222a and a core 222b. This wireless power transfer coil may be complementary to the wireless power transfer coil of electronic device 210 and may be of broadly similar design and construction. To that end, winding 222a may take a variety of forms and may be made from one or more turns of wire wrapped around core 222b. Electrical current flowing through winding 222a can induce a magnetic flux in core 222b, with this magnetic flux being the mechanism by which power is transferred from PTx to PRx. Along with the physical dimensions of the coil, the number of turns of winding 222a can determine the inductance of the wireless power transfer coil, which may be selected to achieve the desired level of power transfer at the desired frequency. For operation at high frequencies, e.g., above 10 MHz and, for example, 13.56 MHz, a relatively low inductance may be required. This inductance may vary with the amount of power transfer required, but in some applications may be on the order of nanohenries (nH). In at least some embodiments, winding 222a may be formed from a single layer winding, meaning that there is a single layer of turns, although this need not be the case depending on the requirements of a particular application.

Core 222b may be made of any suitable ferromagnetic material, such as ferrite. Ferrites may include any of a variety of non-metallic materials (e.g., ceramics) having ferromagnetic particles dispersed therein. In some embodiments, the ferrite material may include a nickel-zinc (NiZn) material as the ferromagnetic component. Such materials may be advantageous when using higher wireless power transfer frequencies, e.g., frequencies above 10 MHz, including for example 13.56 MHz. The ferrite making up core 222b may be formed into what is effectively a "C" shape, illustrated in cross section in FIG. 3. The protrusions of the ends of the "C" shape may reduce the distance between a corresponding core of a wireless power transfer coil in device 210, for example. This reduced distance can improve the coupling coefficient "k" between the coils, allowing for higher power transfer levels. Core 222b may have other shaping features as desired, considering that it may be desirable to maximize the fraction of the volume of receptacle 325 occupied by the core to improve wireless power transfer performance.

In at least some applications, an additional conductive sheath or shield (not shown but similar to conductive sheath or shield 329 discussed above with respect to electronic device 210) may be provided between the wireless power transfer coil and the wall of receptacle 325. This additional conductive sheath or shield may be made from a material that is more conductive than the material making up receptacle 325. For example, receptacle 325 may be made from aluminum or an aluminum alloy, conductive sheath or shield 329 may be made from copper. The benefit of this additional, more conductive material is providing better isolation of the magnetic and electromagnetic fields associated with the wireless power transfer coil from additional components of electronic device 220. The benefits may be greater when conductive sheath or shield 329 is made from a material having a greater difference in conductivity as compared to the material making up receptacle 325. If provided, the conductive shield or sheath may take a variety of forms, such as a copper tape affixed to the inside wall of receptacle 325, copper plating of the inside wall (or entire structure) of receptacle 325, a copper shim positioned between the wireless power transfer coil and the interior wall of receptacle 325, etc. It may be preferable for the thickness of the conducive sheath or shield to be at least the skin depth of the material at the frequency used for wireless power transfer, such that the wireless power transfer fields interact substantially only with the conductive sheath and not with the wall of receptacle 325. Alternatively, receptacle 325 may be formed of a material having the desired level of conductivity so that a conductive shield or sheath is not required.

In at least some applications, the combined structure of receptacle 325 and the associated wireless power transfer coil may be used to provide a "modular" wireless power transfer structure that can easily be placed into an electronic device while reducing or eliminating the effort required to adapt the other electronic systems or modules of the electronic device to accommodate the electromagnetic effects of the wireless power transfer system. This is because receptacle 325 can substantially shield the interior portions of electronic device 220 from magnetic and electromagnetic fields associated with the wireless power transfer system. This is the case even when receptacle 325 includes one or more holes, notches, or other openings (not shown) to allow the wires for the wireless power transfer coil to enter/exit the receptacle.

Figure 4:
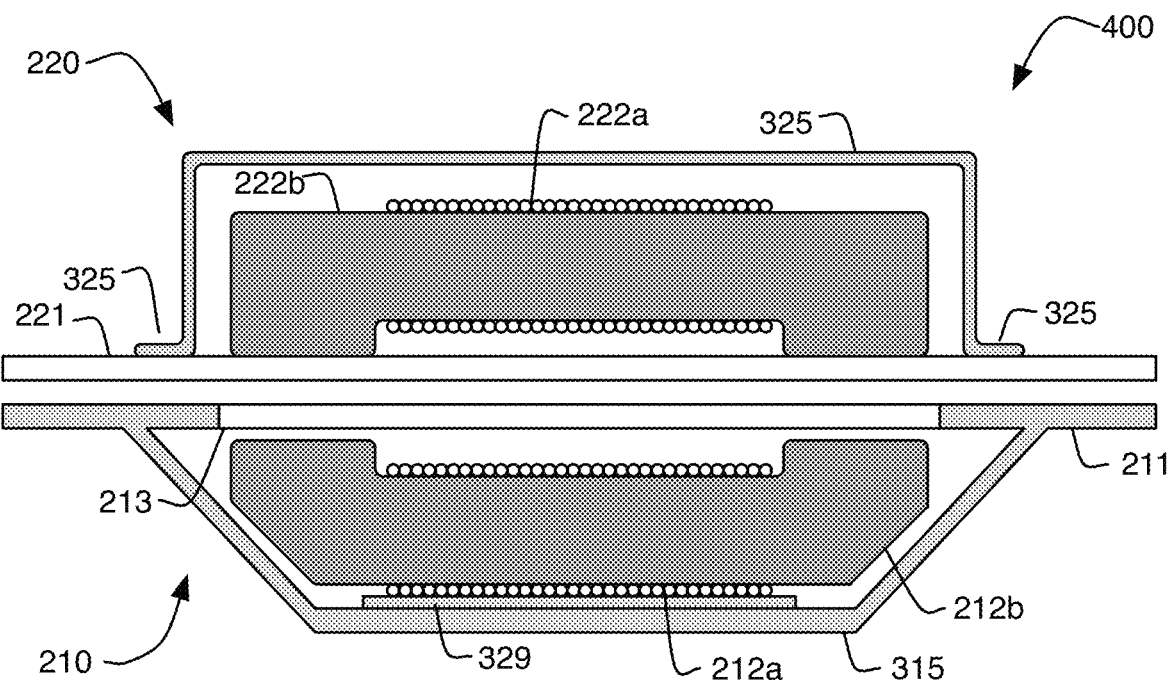
FIG. 4 illustrates an alternative configuration of the wireless power transfer coil configuration of a first electronic device and a second electronic device.

FIG. 4 illustrates an alternative configuration 400 of the wireless power transfer coil configuration of a first electronic device 210 and a second electronic device 220. As can be seen with by comparing FIGS. 3 and 4, the wireless power transfer coil of electronic device 210 is positioned lower within pocket 315 in FIG. 4 and is thus farther from housing 211/window Similarly, in the configuration of FIG. 3, the wireless power transfer coil of electronic device 220 is positioned such that the coil, or at least core 222b partially protrudes from the interior volume defined by receptacle 325. Conversely, in the configuration of FIG. 4, the coil is completely contained within the volume defined by receptacle 325. Thus, in either or both cases, the position (e.g., depth or Z-distance) of the wireless power transfer coil within pocket 315 and/or receptacle 325 may be varied to tune the performance of the wireless power transfer system. In general, positioning the wireless power transfer coils "deeper" or further within their respective volumes will minimize the degree of interaction of the wireless power transfer field with other components of the respective devices. However, increasing the total separation between the respective wireless power coils can decrease the degree of coupling (k) between the two coils, limiting the amount of power that can be transferred and/or increasing the potential for interference and/or emissions associated with "fringing" of the field between the two coils. Thus, the positions of the wireless power transfer coils within the respective pocket or receptacle may be tailored as a function of overall desired system performance. Though, in all cases, the wireless power transfer coils should be positioned at least "partially" within the respective pocket or receptacle and may be positioned "totally" within the respective pocket or receptacle, as desired. ("Totally" in this sense means that the wireless power transfer coil is completely within the volume defined by the pocket or receptacle, even though there must be an open side or face of the pocket or receptacle to allow for coupling between the respective power coils to allow for wireless power transfer. Conversely, "partially" means that at least a portion of the wireless power transfer coil may be located outside the volume defined by the pocket or receptacle.)

Figure 5:
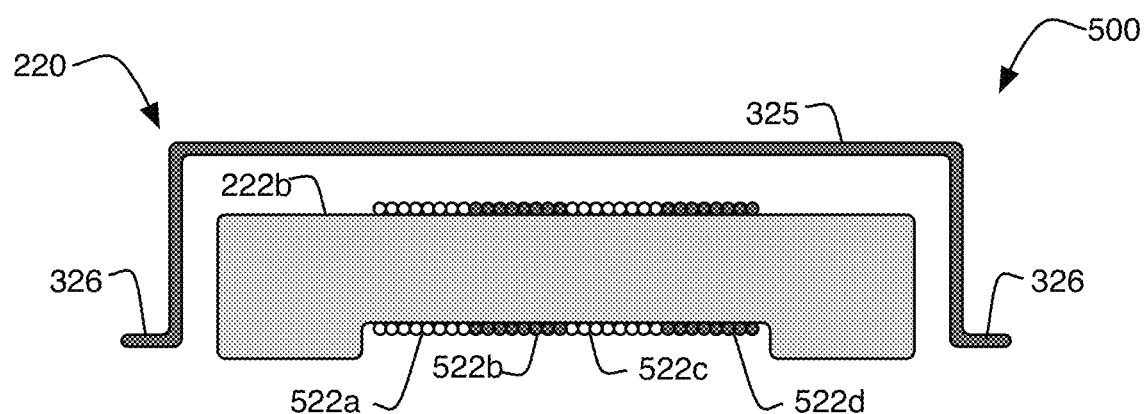
FIG. 5 illustrates an electronic device highlighting features of the wireless power transfer winding.

Turning now to FIG. 5, a view 500 of electronic device 220 illustrating various features of winding 222a are depicted. Although shown and described in the context of a wireless power transfer structure based on a receptacle 325, the same principles may be equally applied to a wireless power transfer coil based on a pocketed configuration as described above with respect to electronic device 210. In either case, as was noted above, some wireless power transfer applications may be designed and configured for operation at relatively high frequencies, such as frequencies above 10 MHz, including, for example, a frequency of 13.56 Mhz. At these frequencies, depending on the power transfer level and other configuration parameters a relatively low inductance may be required. Thus, the wireless power transfer coils may be constructed using a relatively low number of turns.

In the configuration of FIG. 5, four turns are provided, denoted 522a, 522b, 522c, and 522d. Each turn may be made up of multiple strands. In the illustrated example, each turn is made up of eight "parallel" strands, although other numbers of turns and numbers of strands per turn could be used as appropriate for a particular implementation. In at least some embodiments, more strands per turn will increase the coupling factor "k" between the respective coils, at the expense of some reduction in quality factor "Q" of the winding. As a general principle, coupling factor "k" dictates the maximum level of wireless power transfer, while quality factor "Q" determines the efficiency (among other characteristics) of the wireless power transfer process.

Thus, for at least some applications, it may be important to achieve a sufficient degree of coupling to allow the required degree of power transfer, even if this degree of coupling comes at the expense of some efficiency. In other words, efficiency is a secondary consideration if the system cannot accommodate the desired level of power transfer. Additionally, as was noted above, the winding 222a may be constructed in a single layer. Multiple layers may be required if more turns than can fit on core 222b are required, although multiple layers increase proximity effect associated with current flow through the winding and thus the AC resistance of the winding. Thus, particularly for high frequency implementations, a single-layer winding may be preferable.

Figure 6:
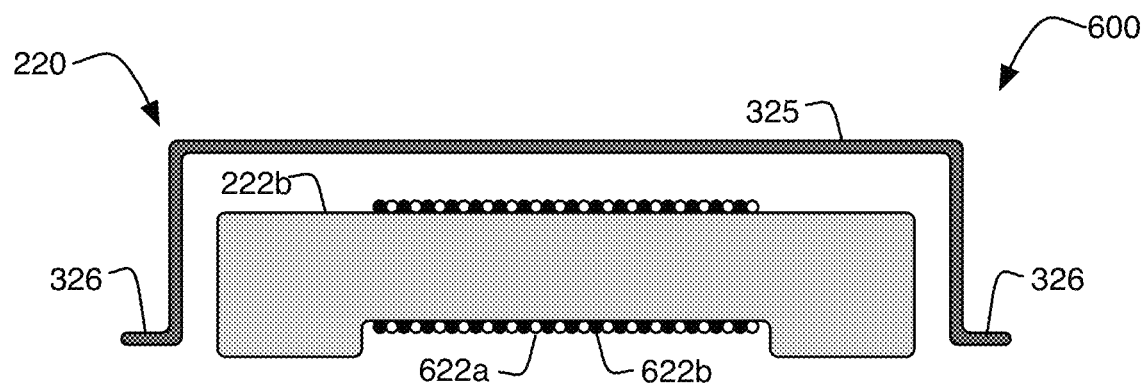
FIG. 6 illustrates an electronic device highlighting additional/alternative features of the wireless power transfer winding.

FIG. 6 illustrates a view 600 of electronic device 220 illustrating various alternative features of winding 222a. Although shown and described in the context of a wireless power transfer structure based on a receptacle 325, the same principles may be equally applied to a wireless power transfer coil based on a pocketed configuration as described above with respect to electronic device 210. In either case, as was noted above, some wireless power transfer applications may be designed and configured for operation at relatively high frequencies, such as frequencies above 10 MHz, including, for example, a frequency of 13.56 Mhz. At these frequencies, depending on the power transfer level and other configuration parameters a relatively low inductance may be required. As was described above each turn may be made up of multiple strands. In at least some applications it may be desirable to provide spacing between the turns of each strand with a non-conductive spacer. The winding of FIG. 6 is constructed with conductive turns 622a (e.g., conductive wire) and non-conductive spacers 622b (e.g., plastic or another material). In at least some embodiments, the spacers may have dimensions substantially similar to the conductive windings. In other embodiments, the spacers may be smaller or larger than the conductors, to provide the desired degree of spacing to achieve the desired magnetic properties of the winding and wireless power transfer system as a whole. The alternating conductive winding/spacer arrangement of FIG. 6 may be combined with the multiple strands of wire per turn as desired or appropriate for a given application.

Described above are various features and embodiments relating to wireless power transfer structures for electronic devices. Such arrangements may be used in a variety of applications but may be particularly advantageous when used in conjunction with electronic devices such as mobile phones, tablet computers, laptop or notebook computers, and accessories, such as wireless headphones, styluses, etc. Additionally, although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The foregoing describes exemplary embodiments of wireless power transfer systems that are able to transmit certain information amongst the PTx and PRx in the system. The present disclosure contemplates this passage of information improves the devices' ability to provide wireless power signals to each other in an efficient manner to facilitate battery charging, such as by sharing of the devices' power handling capabilities with one another. Entities implementing the present technology should take care to ensure that, to the extent any sensitive information is used in particular implementations, that well-established privacy policies and/or privacy practices are complied with. In particular, such entities would be expected to implement and consistently apply privacy practices that are generally recognized as meeting or exceeding industry or governmental requirements for maintaining the privacy of users. Implementers should inform users where personally identifiable information is expected to be transmitted in a wireless power transfer system and allow users to "opt in" or "opt out" of participation. For instance, such information may be presented to the user when they place a device onto a power transmitter, if the power transmitter is configured to poll for sensitive information from the power receiver.

Risk can be minimized by limiting the collection of data and deleting data once it is no longer needed. In addition, and when applicable, data de-identification can be used to protect a user's privacy. For example, a device identifier may be partially masked to convey the power characteristics of the device without uniquely identifying the device. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy. Robust encryption may also be utilized to reduce the likelihood that communication between inductively coupled devices are spoofed.

The invention claimed is:

1. An electronic device comprising:
a metallic housing defining an interior that contains one or more systems of the electronic device, the metallic housing further defining a pocket inside the metallic housing separated from the interior, the pocket having a window to an exterior of the metallic housing to facilitate wireless power transfer; and
a wireless power transfer coil comprising a magnetic core and a winding disposed inside the metallic housing at least partially within the pocket.

2. The electronic device of claim 1 wherein the wireless power transfer coil is disposed completely within the pocket.

3. The electronic device of claim 1 wherein the magnetic core is a nickel-zinc ferrite.

4. The electronic device of claim 1 wherein:
the magnetic core has a C-shaped cross section;
ends of the C-shaped cross section are disposed within or adjacent the window; and
the winding is wrapped about a central portion of the C-shaped cross section.

5. The electronic device of claim 4 wherein the winding is a single layer winding.

6. The electronic device of claim 5 wherein the winding further comprises a plurality of wire strands per turn.

7. The electronic device of claim 5 wherein the winding further comprises one or more non-metallic spacers disposed between strands of the winding.

8. The electronic device of claim 1 further comprising a conductive shim disposed between the wireless power transfer coil and a metallic wall defining the pocket.

9. The electronic device of claim 8, wherein the conductive shim is formed of copper tape affixed to the metallic wall defining the pocket.

10. The electronic device of claim 1 wherein the pocket serves as a shield to isolate the one or more systems of the electronic device from the wireless power transfer coil.

11. An electronic device comprising:
a non-metallic housing defining an interior that contains one or more systems of the electronic device; and
a wireless power transfer module that further comprises:
a metallic structure defining a receptacle disposed inside and separated from the interior of the non-metallic housing, the receptacle having at least one open side to facilitate wireless power transfer; and
a wireless power transfer coil comprising a magnetic core and a winding disposed at least partially within the receptacle.

12. The electronic device of claim 11 wherein the metallic structure defining the receptacle is affixed to the non-metallic housing.

13. The electronic device of claim 11 wherein the wireless power transfer coil is disposed completely within the receptacle.

14. The electronic device of claim 11 wherein the magnetic core is a nickel-zinc ferrite.

15. The electronic device of claim 11 wherein:
the magnetic core has a C-shaped cross section;
ends of the C-shaped cross section are disposed within or adjacent the open side; and
the winding is wrapped about a central portion of the C-shaped cross section.

16. The electronic device of claim 15 wherein the winding is a single layer winding.

17. The electronic device of claim 16 wherein the winding further comprises a plurality of wire strands per turn.

18. The electronic device of claim 16 wherein the winding further comprises one or more non-metallic spacers disposed between strands of the winding.

19. The electronic device of claim 11 further comprising a conductive shim disposed between the wireless power transfer coil and the metallic structure defining the receptacle.

20. The electronic device of claim 19, wherein the conductive shim is formed of copper tape affixed to the metallic structure defining the receptacle.

21. The electronic device of claim 11 wherein the receptacle serves as a shield to isolate the one or more systems of the electronic device from the wireless power transfer coil.

22. A wireless power transfer module comprising:
a metallic structure defining a receptacle having at least one open side to facilitate wireless power transfer; and
a wireless power transfer coil comprising a magnetic core and a winding disposed at least partially within the receptacle;
wherein:
the magnetic core has a C-shaped cross section;
ends of the C-shaped cross section are disposed within or adjacent the open side; and
the winding is a single-layer winding wrapped about a central portion of the C-shaped cross section.

23. The wireless power transfer module of claim 22 wherein the winding further comprises a plurality of wire strands per turn.

24. The wireless power transfer module of claim 22 wherein the winding further comprises one or more non-metallic spacers disposed between strands of the winding.

* * * * *